United States Patent [19]
Jentsch

[11] 3,776,611
[45] Dec. 4, 1973

[54] AUTOMATIC DOOR CLOSER

[75] Inventor: Dietrich Jentsch, Ennepetal-Voerde, Germany

[73] Assignee: Dorma Baubeschlag GmbH & Co., KG, Ennepetal-Voerde, Germany

[22] Filed: Dec. 15, 1972

[21] Appl. No.: 315,481

[30] Foreign Application Priority Data
Dec. 18, 1971 Germany............... P 21 63 095.5

[52] U.S. Cl. ............................................. 308/36.1
[51] Int. Cl. ............................................. F16c 33/74
[58] Field of Search .................. 308/36.1; 277/188, 277/189; 16/84

[56] References Cited
UNITED STATES PATENTS
2,825,590  3/1958  Sutherland.................... 277/188
3,421,412  1/1969  Ackley......................... 308/36.1
3,076,683  2/1963  Hanley......................... 308/36.1
2,757,053  7/1956  Green.......................... 277/188
3,171,334  3/1965  Rasmussen.................... 277/188

*Primary Examiner*—Charles J. Myhre
*Attorney*—Michael S. Striker

[57] ABSTRACT

The shaft of an automatic door closer, to which a door is to be connected, is mounted in a bearing bushing located in a bore of the oil filled housing of the door closer. A pair of sealing rings, held in place by releasable means, seal the shaft with respect to the bushing and the latter with respect to the housing bore.

4 Claims, 2 Drawing Figures

PATENTED DEC 4 1973  3,776,611

AUTOMATIC DOOR CLOSER

BACKGROUND OF THE INVENTION

The present invention relates to an automatic door closer in which the shaft of the door closer, which is adapted to be coupled at an end portion thereof to the door, is mounted in the housing of the door closer by means of bearing bushings and in which sealing rings are provided to seal each shaft end portion with respect to the bushing and the latter with respect to the bore of the housing in which the bearing bushing is located. Identical bearing and sealing arrangements are provided for the opposite end portions of the shaft in many door closers of this kind. Since the door closers have to be mounted in the door frame or in the door itself, the overall dimensions for the door closer should be held as small as possible, which in turn necessitates a very compact construction of the bearing and sealing arrangement for the opposite end portions of the shaft. Various constructions are known in the art which attempt to provide such compact bearing and sealing arrangements for the end portions of the closer shaft. In a known door closer there are provided in two opposite wall portions of the closer housing a bearing bushing which, with part of its length, projects outwardly of the housing and is there encompassed by a support plate connected to the housing. Each of the bearing bushings is provided in its bearing bore with an annular groove in which a sealing ring is located which seals the shaft with respect to the bearing bushing. Each bearing bushing is sealed against the housing by a second sealing ring which is clamped between a flange of the bearing bushing and an annular shoulder of the housing. This known arrangement is rather difficult to manufacture and has the additional disadvantage that the bearing bushing is axially movable.

In another known door-closer arrangement, both end portions of the closer shaft are turnably mounted in bearing bushings fixedly arranged in stepped bores formed in opposite wall portions of the housing. In this arrangement a ring is provided in the large diameter portion of each bore abutting against the respective bearing bushing, and this ring is formed at the inner and outer peripheral surface thereof with an annular groove in which a pair of sealing rings are respectively located, so that the inner sealing ring seals the shaft end portion with respect to the bushing and the outer sealing ring seals the outer surface of the bushing against the inner surface of the large diameter bore portion in the housing wall. The aforementioned ring is held in proper place by a snap ring located in a groove of the large diameter bore portion of the housing. This known arrangement is likewise relatively expensive to manufacture and the ring carrying the two sealing rings has to have a relatively great height due to the two annular grooves provided at the inner and outer surface thereof.

SUMMARY OF THE INVENTION

It is an object of the present invention to provide a door closer provided with a bearing and sealing arrangement for the closer shaft which can be manufactured at very reasonable cost and in which the axial length of the bearing and sealing arrangement can be held at a minimum.

With these and other objects in view, which will become apparent as the description proceeds, the bearing bushing for the closer shaft of the door closer is formed at its outwardly facing end with an annular cutout surrounding the shaft in which a first sealing ring is located which sealingly engages the shaft, whereas a second sealing ring surrounds the outer surface of the bushing and is located in the large diameter portion of a stepped bore provided in the housing wall in which the bushing is located so that the second sealing ring engages with an end face a shoulder provided between the large and the small diameter portion of the aforementioned bore and with its inner peripheral surface the outer surface of the bushing and with its outer peripheral surface the inner surface of the large diameter bore portion. Both sealing rings are held in proper sealing position by an annular disc surrounding the shaft in the large diameter bore portion of the housing and engaging one end face of the bushing and held in place by a snap ring located in a groove formed in the inner surface of the large diameter bore portion. This arrangement is very simple to manufacture and the axial length of the sealing arrangement can be held at a minimum.

In a preferred arrangement the aforementioned annular disc has an inner annular portion offset in axial direction with respect to an outer annular portion thereof such that the face of the snap ring opposite to the face which engages the annular disc is substantially flush with the face of the inner annular portion which faces away from the first sealing ring. Preferably, the end face of the bushing which is engaged by the annular disc is offset in the same manner as the latter. Furthermore, the bushing has preferably at its outer end an annular flange located in the large diameter portion of the bore and defining with the latter an annular space in which the second sealing ring is located.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
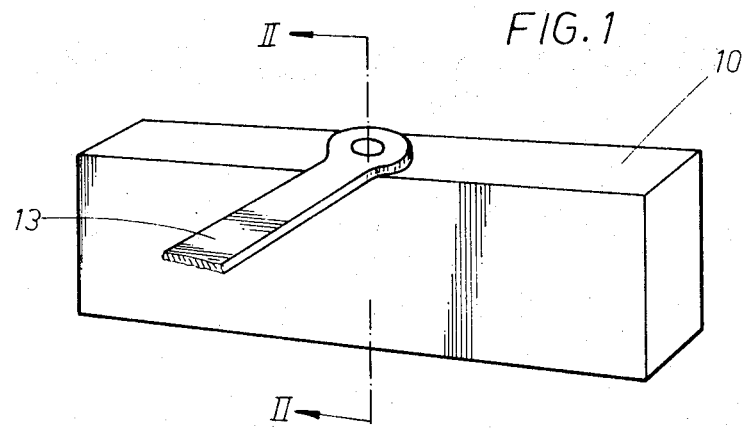
FIG. 1 is a perspective view of an automatic door closer according to the present invention.
Figure 2:
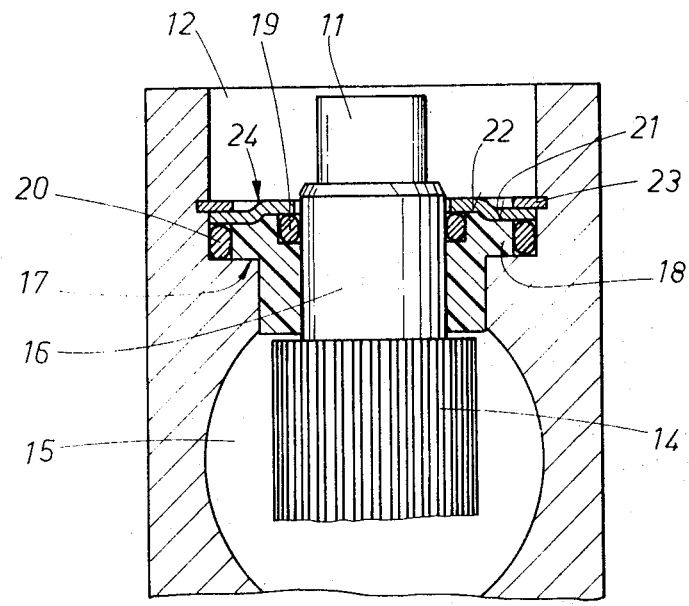
FIG. 2 is a section taken along the line II—II of FIG. 1 and drawn to an enlarged scale.

As shown in FIG. 1, the door closer according to the present invention has a, preferably prism-shaped, housing 10, which may be mounted by means of screws, extending through openings in the housing, which are not illustrated in FIG. 1, to the door, respectively to the door frame. As shown in FIG. 2 a closer shaft extends in vertical direction transversely through the housing 10 and with opposite end portions 11 into large diameter portions 12 of stepped bores provided in opposite wall portions of the housing. For simplification reasons, FIG. 2 shows only the bore formed in the upper housing wall and the elements coordinated therewith, but it is to be understood that the closer shaft has also a lower end portion provided with a bearing and sealing arrangement as shown in FIG. 2 for the upper shaft end portion. Both bearing and sealing arrangements are identical and therefore only one of the same will not be described. In correspondence with the arrangement of the door closer at the upper or the lower end of the door, one or the other end portion 11 of the closer shaft is connected to a lever 13 forming part of a linkage, and this lever is arranged with a small clearance from the adjacent outer face of the housing. A hub, not shown in the drawing, of the lever 13 extends into the large diameter bore portion 12 and is fixedly connected in any convenient, well-known manner to the shaft end portion 11 for turning therewith. The central portion of the closer shaft is formed as a pinion 14 which is located in an axial cylinder bore 15 of the housing in which a piston, not shown in the drawing, is axially movable, which serves in a knonwn manner to dampen the movement of the door and which serves also as a movable abutment for a compression spring, likewise not shown in the drawing, which in a known manner, stores energy when the door is moved from the closed to the open position to thus move the door, when released in an open position, in a direction toward the closed position. The piston is provided in a known manner with a longitudinal slot and a web of the piston bordering the slot is constructed as a rack meshing with the pinion 14. Bearing portions 16 are arranged to opposite sides of the pinion 14, only the upper of the bearing portions 16 being shown in FIG. 2. Each of the bearing portions 16 is turnably mounted in a bearing bushing 17 the outer end of which is provided with an annular flange 18. The outer end of each bearing bushing 17 is formed with an annular cutout 19 surrounding the bearing portion 16 of the shaft and a first sealing ring, sealing the shaft portion 16 against the bushing, is located in the annular cutout 19. The outer diameter of the flange 18 is smaller than the inner diameter of the large diameter bore portion 12 and defines with the inner surface of this large diameter bore portion an annular space 20 in which a second sealing ring is located. The outer end face of the bushing 17, which is preferably formed from plastic material, is provided with a pair of axially offset annular faces 21 and 22. The axial offset of the faces 21 and 22 corresponds to the thickness of a snap ring 23 engaged with an outer annular portion thereof in an annular groove extending outwardly from the inner surface of the large diameter bore portion 12 in the housing. The snap ring 23 secures an annular disc 24 against the outer end face of the bearing bushing 17 and the annular disc surrounds with a slight annular clearance the bearing portion 16. The annular disc 24 has likewise an inner annular portion offset with regard to the outer annular portion thereof in the same manner as the inner and outer annular face portions 22 and 21 of the end face of the bushing 17 are offset. The outer diameter of the inner annular portion of the disc 23 is smaller than the inner diameter of the snap ring 23 to provide the necessary clearance for deforming the snap ring during mounting thereof. The annular disc 24 engages the inner and the outer sealing ring and holds the latter in proper sealing engagement with the bearing portion 16 of the shaft, respectively the outer surface of the flange 18 of the bearing bushing.

The annular spaces 19 and 20 shown in FIG. 2 can be manufactured in a very simple manner. The sealing rings can be easily placed into the annular spaces 19 and 20 and these spaces can be easily closed by the annular disc 24, which in turn is properly held in place by the snap ring 23. Especially by offsetting the annular disc 24 in the described manner, the axial length of the sealing arrangement can be held to a minimum.

The bearing and sealing arrangement for the lower end of the closer shaft, not shown in the drawing, may be constructed in exactly the same manner as described above.

It will be understood that each of the elements described above, or two or more together, may also find a useful application in other types of a door closer differing from the types described above.

While the invention has been illustrated and described as embodied in a door closer with a bearing and sealing arrangement for opposite end portions of the closer shaft in which each of the bearing and sealing arrangements can be efficiently manufactured and assembled and in which the axial length of each bearing and sealing arrangement can be held to a minimum, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. In an automatic door closer, a combination comprising a housing adapted to be filled with oil, said housing being formed in a wall portion thereof with a stepped bore forming between its outwardly facing large diameter end and the small diameter end a shoulder; a shaft in said housing and extending with an end portion thereof into said bore, said end portion being adapted to be connected to a door for turning therewith; a bearing bushing in said stepped bore and mounting said shaft in the region of said end portion turnably about its axis, said bushing being formed at its outwardly facing end with an annular cutout surrounding said shaft; a first sealing ring in said annular cutout and sealingly engaging said shaft; a second sealing ring located between the inner surface of said large diameter bore portion and the outer surface of said bushing and resting on said shoulder for sealing the bushing in said stepped bore; and means for holding said first and said second sealing ring in sealing engagement with said shaft and said bushing and comprising an annular disc engaging with one face thereof said sealing rings and a snap ring in a groove of said large diameter bore portion and engaging the other face of said disc.

2. A combination as defined in claim 1, wherein said annular disc has an inner annular portion offset in axial direction with respect to an outer annular portion such that the face of said snap ring opposite to the face which engages said annular disc is substantially flush with the face of said inner annular portion which faces away from said first sealing ring.

3. A combination as defined in claim 1, wherein said bushing has an end face engaged by said annular disc, said end face being offset in the same manner as said disc.

4. A combination as defined in claim 1, wherein said bushing has at one end thereof an annular flange located in said large diameter portion of said bore, said annular flange having an outer diameter smaller than the diameter of said large diameter bore portion so as to define therewith an annular space in which said second sealing ring is located.

* * * * *